Feb. 26, 1929.                                     1,702,126
F. H. VAN HOUTEN
DOUGH DIVIDER
Filed July 21, 1926        2 Sheets-Sheet 1
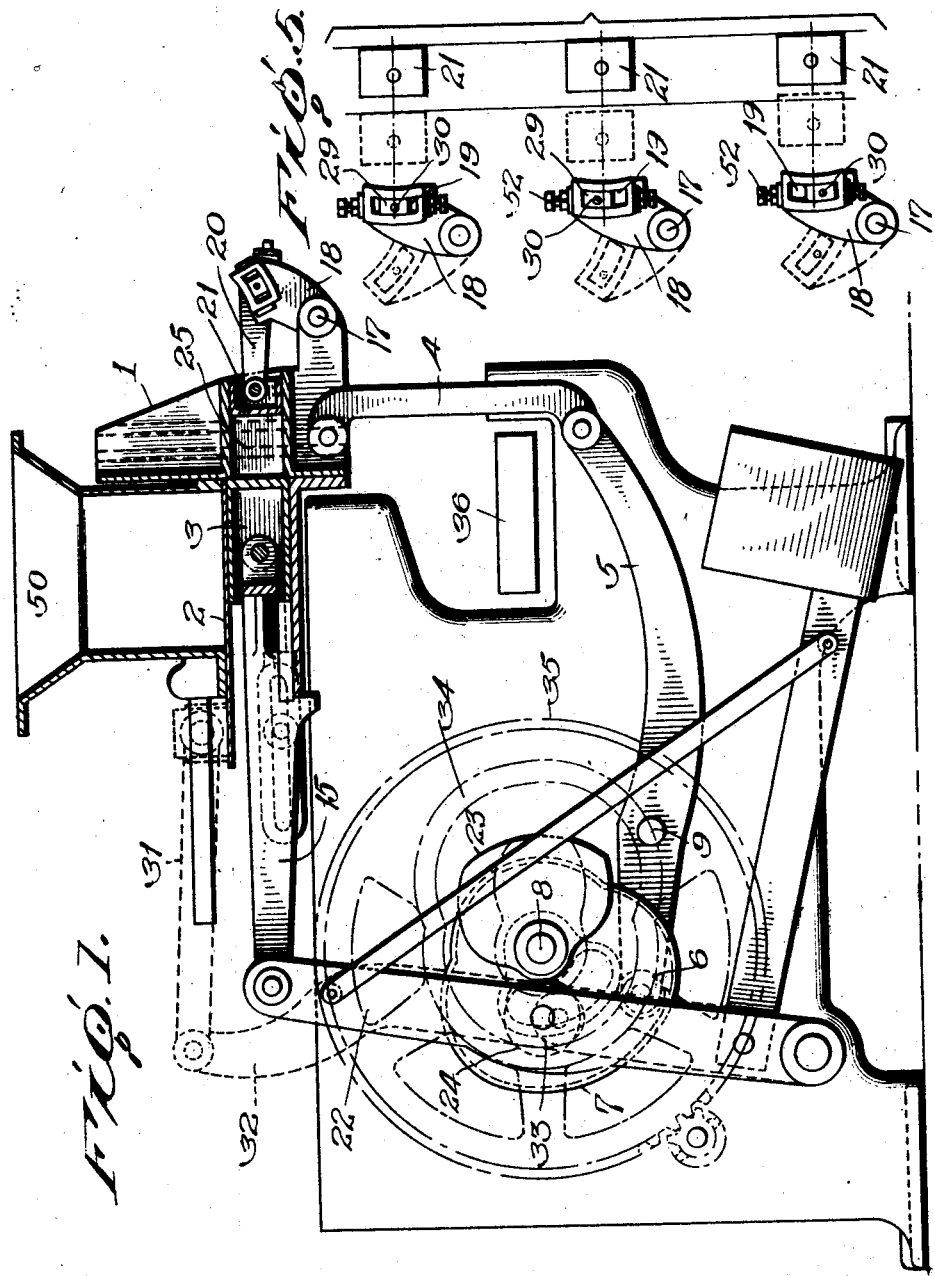
Inventor
Frank H. Van Houten
By
His Attorneys

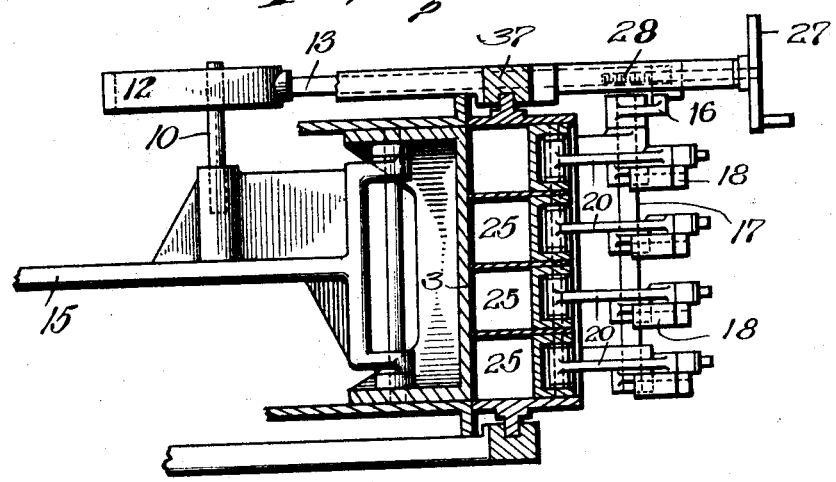
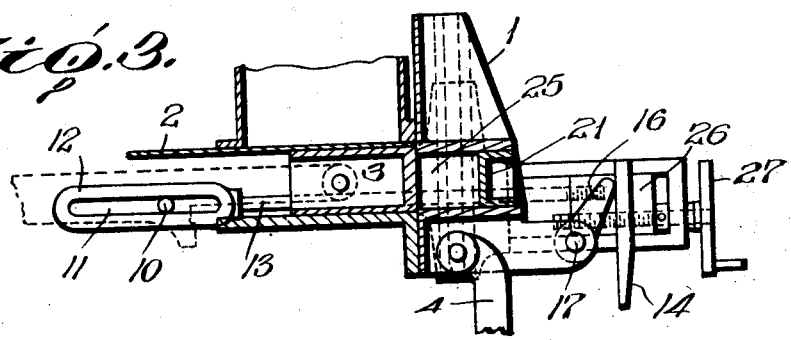
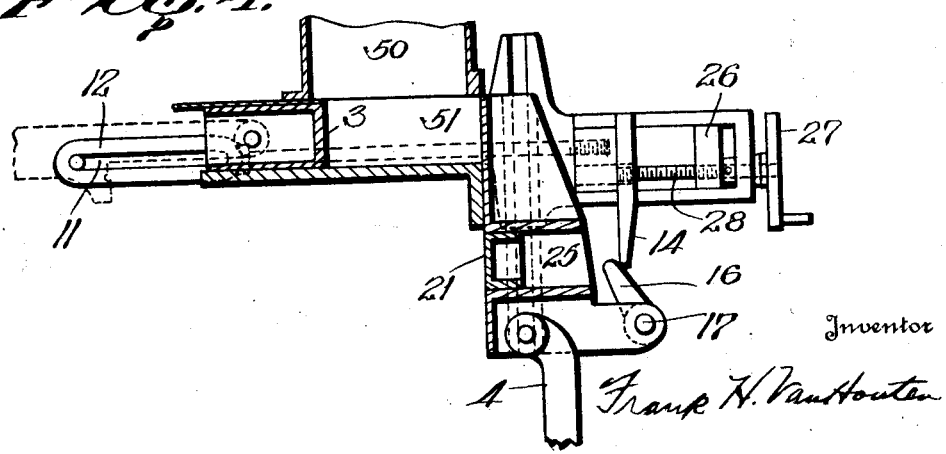

Patented Feb. 26, 1929.

1,703,126

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

DOUGH DIVIDER.

Application filed July 21, 1926. Serial No. 124,021.

This invention relates to improvements in dough handling machinery and particularly to the type of apparatus known as automatic dough dividers.

Dough dividers generally embody a dividing head which has a plurality of pockets for receiving more or less definite quantities of dough from the hopper of the divider, this head being slidable from its dough receiving position to a discharging position where the dough in the pockets is ejected onto a traveling belt by which it is carried to other apparatus.

For ejecting the dough from the pockets each of the latter have a plunger slidably mounted therein and it is highly desirable that these plungers be connected together in order to insure uniform action. One object of the present invention, therefore, is to provide a dividing head in which the plungers of the several pockets are connected together and operate as a unit.

Dough passing from the hopper to the pockets of the dividing head first moves from the hopper into a compression box immediately below the hopper from which it is afterwards pressed by a piston into the pockets. It has been found that the dough while confined in the compression box is more firmly compressed at the sides of said box and in dividers having a dividing head with, say, four pockets, it has been found that the two outside pockets must be made uniformly smaller than the two center pockets in order to compensate for the different degrees of compression exerted on the dough and thus insure uniform quantities of dough being pressed into all of the pockets. In view of this a further object of the present invention is to provide means whereby the ejecting plungers may be retracted in their respective pockets different distances, that is, in a head having four pockets the two plungers of the two center pockets will be retracted a greater distance than the two outside pockets, whereby the quantity of dough compressed in the two center pockets will be substantially the same as the quantity deposited in the two outside pockets notwithstanding the fact that the dough in the two outside pockets has been placed under greater compression than that in the two inside pockets.

With these and other objects in view, the invention consists in certain novel details of construction and combinations and arrangements of parts all as will be hereinafter more fully described and the novel features thereof particularly pointed out in the appended claims.

In the accompanying drawings:—

Figure 1 is a side elevational view of a dough divider embodying the present improvements.

Fig. 2 is a horizontal sectional view taken through the compression box and pockets of the divided head.

Fig. 3 is a vertical sectional view taken through the compression box and one of the pockets of the dividing head showing the parts in the position which they occupy at the time the dough has been pressed from the compression box into the pockets.

Fig. 4 is a view similar to Fig. 3 but showing the parts in the positions they occupy when the dividing head has been moved to its discharging position and the plungers had been moved to eject the dough from the pockets.

Fig. 5 is a series of views illustrating more or less diagrammatically the adjustable connections for obtaining a differential movement of the several plungers for the pockets in the dividing head.

The batch of dough to be divided is deposited in the hopper 50 of the machine and when the sliding knife 2 and piston 3 are retracted from the positions shown in Fig. 1 the dough is fed into the space below the hopper, this space 51 being termed the compression box. The knife 2 is retracted by the link 31 which is connected to the lever 32, the said lever being pivoted on the frame of the machine and carrying a cam roller 33 which engages the cam 34, said cam being a part of the driving gear 35. The piston 3 is actuated by the lever 15 connected to the lever 22 pivoted on the main frame and having a cam roller 24 which engages the cam 23 which is also driven by the driving gear 35. These driving connections will be found on standard machines heretofore furnished the trade and as they form no part of the present invention they are simply shown in outline and it is believed that this general description will suffice for present purposes. After the knife and piston have been retracted and a quantity of dough has passed down into the compression box 51 continued movement of the cams 23 and 24 causes the knife and piston to be returned to the positions shown in Fig. 1 whereupon the dough in the compression box will be pushed by the piston into the pockets 25 in the dividing head 1. It should be stated that the relative positions of the cams 23 and 34 is such that the knife 2 starts to move forward and is followed by the piston 3, knife 2 being first moved all the way across the bottom of the hopper after which the piston 3 continues to move forward, pressing the dough into the pockets. The bottom of the pockets are formed by the plungers 21 and after the dough has been thus deposited in the pockets the dividing head 1 is moved downwardly to the position shown in Fig. 4 whereupon the plungers 21 are reciprocated in the pockets toward the mouths of said pockets for the purpose of ejecting the dough on to the traveling belt 36 which delivers the lumps of dough thus ejected from the pockets to other apparatus for further treatment. The mechanism for actuating the plungers 21 will be later described but for moving the dividing head from the position shown in Fig. 1 to the position shown in Fig. 4 and back again to its horizontal position for again receiving dough from the compression box there is a lever 5 supported on a shaft 9 in the main frame of the machine, said head being connected at one end by a link 4 to the dividing head and at its opposite end provided with a cam roller 6 which engages the cam 7 on the shaft 8. These connections for reciprocating the dividing head are also well known. The sliding head is guided in its vertical movements by the guide 37 attached to the side frames of the machine.

In order that the several plungers for the pockets in the dividing head may be operated in unison each plunger has a connecting rod 20 attached to a rocker arm 18 mounted on the rock shaft 17 which also carries preferably at one side of the machine an arm 16 (see Figs. 2 to 4). By providing means for engaging the rocker arm 16 so as to move the same toward the shaft as viewed in Fig. 4 the shaft 17 will be rocked with the result that all of the plungers will be moved by the rocker arms 18 and their connecting rods 20 toward the mouth of the pocket to eject the dough therefrom as shown in Fig. 4. No driving connections are necessary for retracting the plunger as this movement may be imparted to said plungers by the dough being pressed into the pockets by the piston 3. While various forms of connections may be provided for thus actuating and moving arm 16 to eject the dough from the pockets the connections shown in the present instance consist of a pin 10 carried by the lever 15 and engaging in a slot 11 in the link 12 connected to one end of a rod 13 slidably secured at the side of the machine frame. At its opposite end rod 13 is connected to a sliding block 26 which carries a depending arm 14 adapted to engage the rocker arm 16 of the shaft 17. With these connections, movement of the lever 15 and piston 3 causes the rod 13 and the depending arm 14 to be moved to the position shown in Fig. 3 so that as the dough is pressed into the pockets 25 by the piston the plungers are free to move backward or be retracted in the pockets until the rock arm 16 on shaft 17 engages the depending arm 14. These movements take place, of course, while the dividing head is in its elevated position with the pockets in alinement with the compression box and after the pockets have thus been filled the cam 7 actuates lever 5 so as to depress the dividing head to the position shown in Fig. 4. After the dividing head has been lowered cam 23 causes lever 22 and lever 15 to retract the piston 3 or withdraw it from the compression box and during this retraction of said piston the pin 10 will also retract rod 13, thereby moving the depending member 14 to the left as shown in Fig. 4 with result that the shaft 17 will be rocked by the rocker arm 16 and the rocker arms 18 to which the plungers are connected and will be turned to the left to eject the lumps of dough on the conveyor 36. After the dough has been ejected from the pockets the dividing head is again elevated and depending arm 14 moved to the right until it assumes the position shown in Fig. 3 so that the parts are again positioned to be re-charged with dough from the compression box when the piston 3 and knife 2 are again moved across the bottom of the hopper.

As has been before mentioned the dough at the sides of the compression box 51 is more compact or more compressed than it is at the center of the box so that if all the pockets 35 were of the same dimensions or depth more dough would be pressed into the side pockets than in the center pockets by the piston 3 on account of the greater density of the dough at the sides of the compression box than in the center of said box. To overcome this inequality of the quantities of dough deposited in the several pockets by the piston 3 means are provided for securing a differential retraction of the plungers 21 in said pockets. Such means may, of course, take various forms but it is preferred that this result be accomplished by providing the rocker arms 18 with the heads having slots 19 therein in which there is slidably held a block 29 carrying a pin 30. Said pin 30 engages the adjacent end of the connecting rod 20 and by adjusting the blocks 29 in the heads 19 toward and from the center of rotation of the rocker arms 18 the throw of the several plungers 21 may be varied at will. This adjustment of the blocks 29 in the heads 19 may be had by the provision of set screws 52 threaded through the heads 19 at the ends of the slots in said heads and engaging the opposite sides of the sliding blocks 29.

With this arrangement a medium throw of the plungers may be had by adjusting the sliding blocks to a point where the pins 30 are in the center line of travel while an adjustment of the pins above said center line will result in a greater throw of the plungers and the adjustment of the pins below the center line will reduce the throw of the plungers. For instance, in a dividing head having four pockets, the pins for the connecting rods of the two center pockets will be adjusted to a point in the center line of travel but the pins for the two side pockets will be adjusted to a point below said center line whereby the plungers in the two side pockets will not be retracted quite as far as the plungers in the two center pockets. In this way the two pockets in which the more compact dough is pressed by the piston 3 will be of less depth when the plungers are retracted than the two center pockets and, consequently, the same quantity of dough, by weight, will be deposited in each and all of the pockets. This adjustment of the pins for the connecting rods of the plungers is clearly shown in the diagrammatic lay-out of Fig. 5 and it will be noticed that the slots for the sliding blocks 29 are somewhat curved. However, it is not essential that the walls of these slots be curved, although it is preferable. Likewise, it may not be necessary to have the pins for the center pockets adjustable as it is believed feasible to have only the plungers for the outer pockets adjustable so as to vary the depth of those pockets proportionately to the quantity of dough that is being deposited in the center pockets. On the other hand, it may be possible to have only the center pockets provided with adjustable plungers as those plungers could be adjusted to have greater throw than the plungers of the outer pockets.

What I claim is:

1. In a dividing head for automatic dough dividers, the combination of a plurality of plungers positioned in a series of pockets in said head, said plungers forming the bottoms of said pockets, a rock shaft movable a fixed distance, mechanism connected to said shaft and the plungers for advancing them towards the mouths of said pockets, and means for effecting a differential movement of said plungers as the latter are retracted whereby substantially uniform quantities of dough will be received in the several pockets.

2. In an automatic dough divider, a hopper, a dividing head having a series of pockets in which dough from said hopper is compressed, a sliding plunger in each pocket, a rock shaft movable a fixed distance, mechanism connected to said shaft and the plungers for advancing them in the pockets to eject dough from the latter, and means for allowing the several plungers to be retracted in said pockets different distances whereby substantially uniform quantities of dough will be deposited in the several pockets.

3. In an automatic dough divider, a hopper, a reciprocating knife, a piston, a dividing head having a series of pockets into which dough from said hopper is pressed by said piston, a plunger in each of said pockets, a rock shaft movable a fixed distance and mechanism connected to said shaft and the plungers for advancing them to eject dough from the pockets, said plungers being retractable in said pockets by the dough pressed into the pockets by the piston, and the connections between said mechanism and plungers embodying means for allowing a differential movement of the several plungers as the latter are retracted.

4. In a dough dividing machine, a dividing head having a series of pockets therein, a plunger slidable in each pocket, operating mechanism connected to said plungers for advancing them in the pockets, said mechanism including a rock shaft movable a fixed distance, and means for adjusting the extent to which the plungers in a portion of said pockets can be retracted whereby the depth of a portion of the pockets may be made greater or less than that of the remaining pockets.

5. In a dough dividing machine, a dividing head having a series of pockets therein, a plunger slidable in each pocket, an operating shaft connected to all of said plungers, and means for varying the retractive movement of a portion of said plungers independently of the extent of movement of said shaft.

6. In a dough dividing machine, a dividing head having a series of pockets therein, a plunger slidable in each pocket, a rock shaft, a rocker arm on said shaft for each plunger, a connecting rod between each rocker arm and plunger, and means for adjusting the throw imparted to said plungers.

7. In a dough dividing machine, a dividing head having a series of pockets therein, a plunger slidable in each pocket, a rock shaft, a rocker arm on said shaft for each plunger, a connecting rod between each rocker arm and plunger, and means for adjusting the points of connection between said rocker arms and connecting rods toward and from the center of rotation of said rock shaft.

8. In a dough dividing machine, a dividing head having a series of pockets therein, a plunger slidable in each pocket, a rock shaft, a rocker arm on said shaft for each plunger, a connecting rod between each rocker arm and plunger, and means for regulating the extent to which the plungers may be retracted without affecting the extent of movement of the rocker arms.

9. In a dough dividing machine, a dividing head having a series of pockets therein, a plunger slidable in each pocket, a rock shaft, a rocker arm on said shaft for each plunger, a connecting rod between each rocker arm and plunger, and means for regulating the extent to which any one of said plungers may be retracted, each plunger being regulable independently of the remaining plungers and independently of the throw of said rocker arms.

10. In a dough dividing machine, a dividing head having a series of pockets therein, a plunger slidable in each pocket, a rock shaft, a rocker arm on said shaft for each plunger, a connecting rod between each rocker arm and plunger, and means for adjusting the throw imparted to said plungers, and means for varying the extent of rocking movement of the rocker arms.

11. In a dough dividing machine, a dividing head having a series of pockets therein, a plunger slidable in each pocket, a rock shaft, a rocker arm on said shaft for each plunger, a connecting rod between each rocker arm and plunger, means for regulating the extent to which any one of said plungers may be retracted, each plunger being regulable independently of the remaining plungers and independently of the throw of said rocker arms, and means for varying the extent of rocking movement of the rocker arms.

12. In a dough divider, a dividing head having a series of pockets therein, a plunger slidable in each pocket, a rock shaft, means for rocking said shaft, a series of rocker arms on said shaft, a connecting rod intermediate each rocker arm and one of said plungers, and means for adjusting the several connecting rods to vary the throw imparted to the individual plungers.

13. In a dough divider, a dividing head having a series of pockets therein, a plunger slidable in each pocket, a rock shaft, means for rocking said shaft, a series of rocker arms on said shaft, a block slidably carried on each rocker arm and adjustable toward and from the center of rotation of said rock shaft, and a connecting rod connected to each sliding block and one of said plungers.

14. In a dough divider, a dividing head having a series of pockets therein, a plunger slidable in each pocket, a rock shaft, means for rocking said shaft, a series of rocker arms on said shaft, a block slidably carried on each rocker arm and adjustable toward and from the center of rotation of said rock shaft, a connecting rod connected to each sliding block and one of said plungers, and means for increasing or decreasing the extent of rocking movement of the rocker arms.

FRANK H. VAN HOUTEN.